United States Patent [19]
Van Mechelen

[11] 3,958,130
[45] May 18, 1976

[54] HYDROELECTRIC GENERATING SYSTEM

[76] Inventor: Bernard Van Mechelen, 704 Bertsch Ave., Crescent City, Calif. 95531

[22] Filed: June 6, 1975

[21] Appl. No.: 584,460

[52] U.S. Cl. ................................. 290/54; 60/639; 185/31
[51] Int. Cl.² .......................................... F03B 7/00
[58] Field of Search .................. 290/43, 44, 54, 55; 60/639; 185/27, 31

[56] References Cited
UNITED STATES PATENTS
993,115  5/1911  Shelley ................................. 60/639

*Primary Examiner*—Robert K. Schaefer
*Assistant Examiner*—John W. Redman
*Attorney, Agent, or Firm*—Clarence M. Crews

[57] ABSTRACT

A hydroelectric generating unit includes a generator shaft about which buckets are pivotally mounted on a common carrier for travel in a common path at equal angular intervals. The bucket carrier is fast on the shaft. Water flow control means, located above the shaft, is driven by the shaft for delivering a measured quantity of gravity impelled water to each bucket as it passes through a loading zone shortly after the bucket has passed top dead center. Each bucket is caused to discharge its load in the vicinity of bottom dead center. A succession of such units, connected for operation in timed relation to one another, is desirably provided.

6 Claims, 7 Drawing Figures

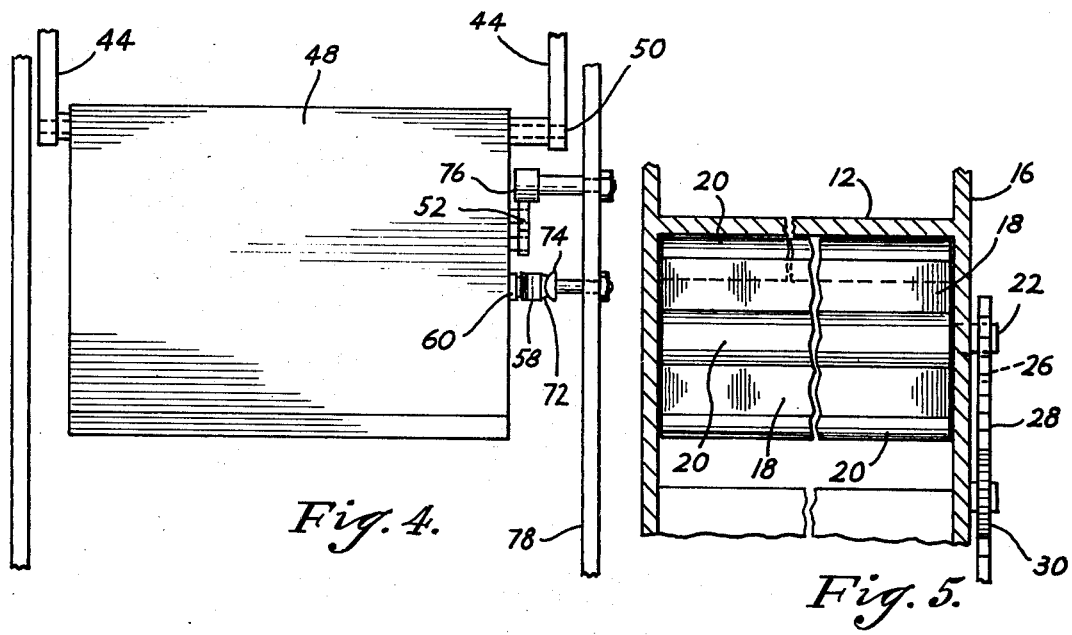
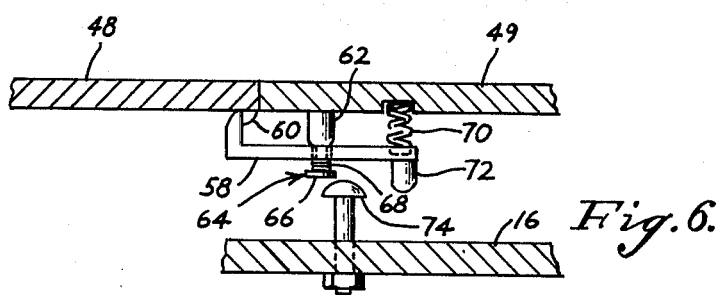
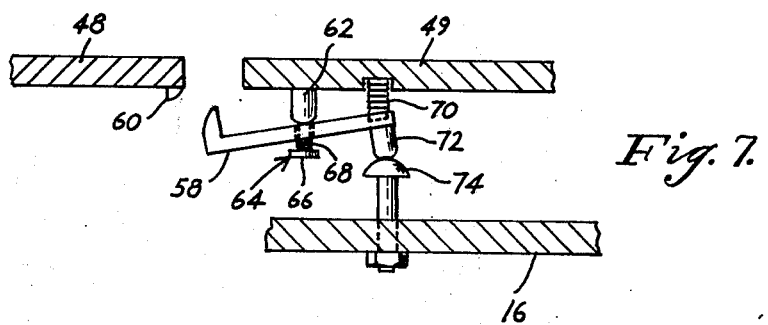

HYDROELECTRIC GENERATING SYSTEM

This invention has for an object the utilization of water for generating electricity without the need for expensive water storage by means of expensive dams. While a system of this kind lacks the advantage of a dam for preventing flooding, it is available in locations and under conditions where a dam would not be feasible, and an equivalent installation or installations can be provided at much less expense. The system, moreover, avoids the accumulation of water under conditions of stagnation, providing always for progress of the water to and beyond the generating system under purifying exposure to sunshine and fresh air.

The present system, moreover, does not mar the natural beauty of the environment nor require the sacrifice of many acres of field or forest to the storage of water.

The present system is applicable to large or small streams and to urban water supply systems.

Units may be varied in size according to requirements, and two or more of my novel systems may be provided in parallel, if that is a more practical arrangement. Since the unit shafts of a given assembly are mechanically connected to operate in unison, any one of them may serve as the generator driving shaft for the assembly.

Other objects and advantages will hereinafter appear.

In the drawing forming part of this specification,

FIG. 4 is a fragmentary view in side elevation of a bucket unit and the associated bucket tripping means;

FIG. 5 is a view in side elevation, broken away intermediate its ends, of the means for intermittently supplying water to the buckets;

FIG. 6 is a fragmentary sectional view showing portions of a bucket and the tripping means thereof; and FIG. 7 is a view similar to FIG. 6 but showing the bucket tripping parts in tripped condition.

Figure 2:
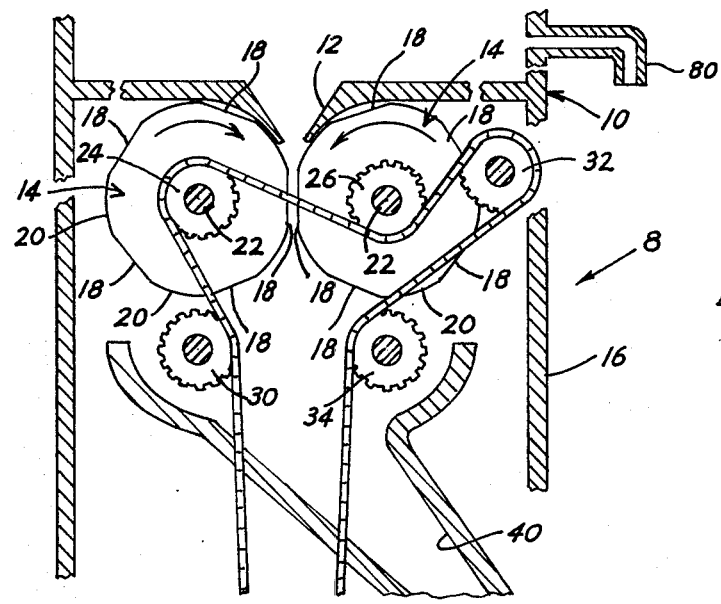
FIG. 2 is a fragmentary view in side elevation showing a single water bucket in water-carrying condition and a portion of the carrying arm thereof.
Figure 2:
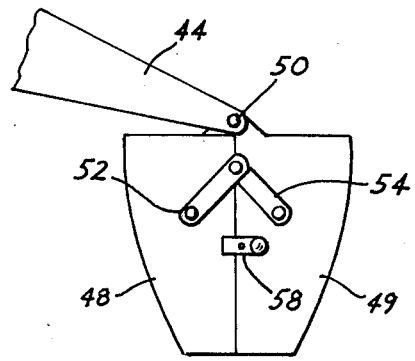
Figure 1:
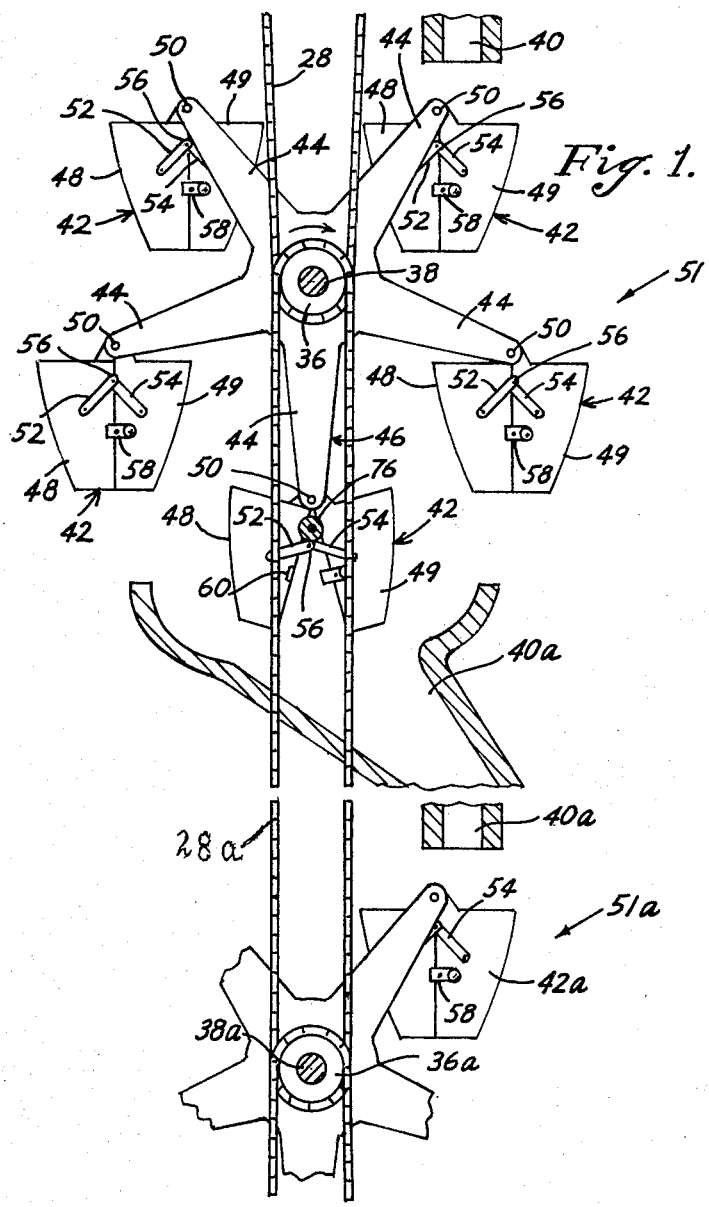
FIG. 1 is a fragmentary view in side elevation, partly in section, showing a system which comprises a series of synchronized generator driving units in combination with a synchronized, intermittent, water supply unit.
Figure 3:
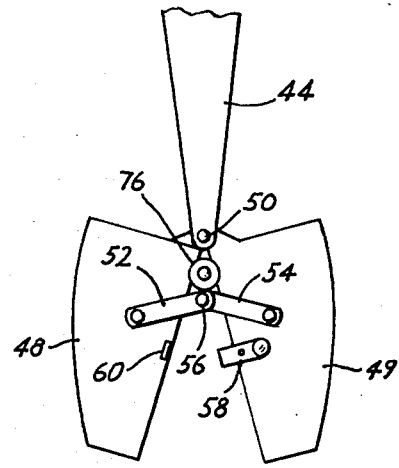
FIG. 3 is a view similar to FIG. 2, but showing the bucket tripped to an open, water-discharging condition.

As illustrated in FIG. 1, an intermittent water delivering unit 8 comprises a tank 10 which constantly receives water from a stream of moderate capacity or from a division of a larger stream. Suitable provision is desirably made of a bypass conductor or stream for conducting surplus water away when the rate of supply is more than ample to keep the tank 10 full. The tank bottom is desirably formed with a tapered open trough 12 for delivering water between a pair of rollers 14,14. Vertical walls 16 (one shown in FIG. 1) snugly engage peripheral portions of the ends of the rollers 14,14 so that all water delivered onto the rollers is confined against spilling uselessly beyond the ends of the rollers.

Each roller in the illustrative structure is divided circumferentially into 10 equal sectors of 36° each. Alternate sectors 18 are flattened while the remaining sectors 20 are arcuate, being of full radius. The rollers 14 are so related that the sectors 20 run in engagement with one another, jointly providing a trough closure beneath the opening 12 throughout 36° of travel of the rollers. Throughout the ensuing 36° of travel opposed flattened sectors 18 travel opposite to one another, permitting gravity flow of water between the rollers. Thus, for 36° of rotation the passage of water between the rollers is cut off, and then for the next 36° of rotation the flow of water is freely permitted.

The rollers 14 are mounted on shafts 22 which extend through and beyond the plates 16. The roller shafts 22 may be journalled in the plates 16. At one end, outside the bounds of the plates 16,16 the shafts 22,22 have fast upon them drive gears 24 and 26. A drive chain 28 engages the gear 24 for driving that gear clockwise, and the gear 26 for driving that gear counter-clockwise. The chain also runs on idler guide sprockets 30, 32 and 34, and is driven by a sprocket 36 fast on a shaft 38, which shaft may have fast upon it the rotor of a generator.

As will be apparent, water is delivered intermittently by gravity and in measured quantity between the rollers 14,14. Whatever water is so delivered falls into a passage 40, being discharged therefrom into one of a series of five buckets 42, each mounted on one of five equally spaced arms 44 of a rotary bucket carrier 46. The carrier is fast on the shaft 38 and constitutes the driver thereof. The five buckets 42, the bucket carrier 46, and the shaft 38 may form a generator operating unit 51.

Each bucket 42 consists of two halves 48 and 49, both halves being pivotally suspended in each instance from a common supporting pin 50. In each instance the bucket halves are connected to one another through a toggle which comprises pivotally connected arms 52, 54, and a pivot pin 56.

Except in the lowermost, discharging position, illustrated in the case of the lowermost bucket 42 in FIG. 1, the bucket halves of each pair are held closed by a latch member 58 on bucket half 49 and a cooperating projection 60 on bucket half 48, as shown best in FIG. 6.

The latch member 58 is rockably supported on a projection 62 of bucket half 49. A screw 64, having a head 66, is threaded into the projection 62 and presses a compression, coil spring 68 against the latch member 58. A compression coil spring 70 lodged at one end in a recess of 49 urges one end of the latch member 58 outward and serves thereby normally to maintain the opposite end of the latch member in the bucket closing relationship illustrated in FIG. 6.

The end of the latch member 58 engaged by the spring 70 is formed with a projection 72. The projection 72 is adapted to be engaged by the head of a stationary stud 74, affixed to one of the plates 16 for rocking the latch member 58 to a position for releasing the bucket half 48 as the bucket approaches bottom dead center position.

At the same time the leading arm 52 of the knuckle portion of the toggle formed by arms 52, 54 is engaged by a fixed abutment member 76 on the plate 78 to straighten the toggle and thereby force the bucket halves 48 and 49 wide apart. The bucket-contained water is thereby quickly released to fall into a passage 40a for delivery to a bucket 42a of a further generator driving unit 51a. The unit 51a is in all respects a duplicate of the unit 51. It is driven in synchronism with the unit 51 by sprockets 36 and 36a fast, respectively, on shafts 38 and 38a and a chain 28a. A chain 28b may be provided to drive a further unit duplicative of units 51 and 51a, and the sequence of such units may be continued as far as the character of the terrain will permit.

Shafts 38, 38a and any subsequent like shafts of the series assist in driving the generator. Generators driven by different assemblies can, of course, by synchronized with one another and caused to feed into a comprehensive system.

It will be understood, of course, that each new assembly or series of generator driving units will start with an intermittent water metering and delivering unit like the unit 8.

A water delivering by-pass 80 of any desired capacity may be provided for surplus water.

I have described what I believe to be the best embodiment of my invention. What I desire to cover by letters patent, however, is set forth in the appended claims.

I claim:

1. A hydroelectric generating mechanism which comprises
    a. an electrical generator unit that includes a generator shaft having affixed thereto a series of evenly spaced, water bucket carrying arms, each pivotally supporting a bucket at the outer end thereof;
    b. a water metering device operated by said shaft and constructed and arranged alternately to deliver water to a bucket in an elevated, water receiving position a little past top dead center for driving the generator shaft and to cut off the delivery of water when a bucket has been substantially filled; and
    c. means for causing each bucket to discharge its load of water at substantially the lower limit of its travel so that it will travel upward empty.

2. A mechanism as set forth in claim 1 in which the metering device comprises a pair of opposed rollers having corresponding alternate flat and rounded sectors arranged in alternation, with the opposed rounded surfaces constructed and arranged cooperatively to seal off the delivery of water and the opposed flat surfaces disposed cooperatively to pass the delivery of water.

3. A mechanism as set forth in claim 2 in which each bucket is composed of two complementary halves pivotally connected to one another, and includes a latch for snugly holding the halves together in water receiving and retaining relation, and means operable to release the latch and spread the halves of each bucket as it nears the conclusion of its downward travel.

4. A mechanism as set forth in claim 1 in which provision is made of an additional electrical generator driving unit like the unit of claim 1 and of means for timing such additional electrical generating unit in harmony with the first, such unit being in all respects a duplicate of the first.

5. A mechanism as set forth in claim 4 in which a series of electrical generator driving units like the first is provided, together with means causing each such unit after the first to be timed for movement in unison with its predecessor and to be driven by water delivered from its predecessor.

6. A mechanism as set forth in claim 5 in which each generator driving unit includes an odd or even number of evenly spaced buckets and each unit, other than the last, is constructed and arranged to deliver water discharged at approximately bottom dead center to a bucket of the next succeeding unit at substantially a half space beyond top dead center.

* * * * *